Patented Mar. 10, 1936

2,033,363

UNITED STATES PATENT OFFICE 2,033,363

SEPARATION OF ISOMERIC CHLORO-METHYL-ANTHRAQUINONES

John M. Tinker, South Milwaukee, and Viktor M. Weinmayr, Milwaukee, Wis., assignors to E. I. du Pont de Nemours & Company, Wilmington, Del., a corporation of Delaware No Drawing. Application February 23, 1934, Serial No. 712,486

4 Claims. (Cl. 260—57)

This invention is directed to the separation of 2,3-chloro-methyl-anthraquinone from 2,1-chloro-methyl-anthraquinone.

When ortho chloro toluene is condensed with phthalic anhydride and the chloro-methyl-2-benzoylbenzoic acid so obtained is ring-closed in sulfuric acid, a mixture of 2,1- and 2,3-chloro - methyl - anthraquinones is obtained. These isomeric chloro - methyl - anthraquinones have heretofore been separated by crystallization from toluene, in which the 2,3-chloro-methyl-anthraquinone is much less soluble than the 2,1-isomer. (Berichte, vol. 47, page 557.) This process, however, makes it necessary to first isolate the mixture of 2,1- and 2,3-chloro-methyl-anthraquinone isomers from the concentrated sulfuric acid ring-closure mass prior to effecting their solution in the organic solvent. Subsequent purification of the crystals from the solvent and the recovery of the solvent for further use adds materially to the cost of producing these compounds in substantially pure form.

We have now found that 2,3- and 2,1-chloromethyl-anthraquinones may be separated in a very efficient manner directly from the concentrated sulfuric acid mass, whereby the cost of separation with respect to both labor and materials is materially reduced.

According to our present invention, these two isomeric chloro-methyl-anthraquinones may be separated from the sulfuric acid ring-closure mass by careful dilution with water. It is found that when the concentration of the acid mass is brought to between about 87% and 75%, the 2,3-chloro-methyl-anthraquinone separates out quantitatively and is substantially free of the 2,1-isomer. After the 2,3-chloro-methyl-anthraquinone has been filtered or otherwise separated from the solution, the acid mass is further diluted to a point where the 2,1-isomer is thrown out substantially completely.

The following example is given to illustrate a preferred method for separating these two isomeric chloro-methyl-anthraquinones, it being understood that numerous changes may be made in the procedure without departing from the spirit of our invention, or the scope of the appended claims.

Example 275 g. of the product obtained for example by condensing phthalic anhydride with ortho chloro toluene and aluminum chloride by milling or in an excess of ortho chloro toluene as solvent, and isolating the benzoyl-benzoic acid derivative by the normal procedure, are dissolved in 2220 g. of 25% oleum and heated to 100–105° C. for three hours or until the ring-closure is completed. There is then added enough 20% sulfuric acid to cut the acidity of the reaction mass to about 83%. During the addition of the dilute sulfuric acid the temperature of the reaction mass is kept preferably at 80–100° C. At this concentration practically all of the 2,3-chloro-methyl-anthraquinone crystallizes out. After cooling to 25° C. it is filtered on a stone filter and washed with a few hundred grams of 83% sulfuric acid. This wash is added to the mother liquor from the filtration. The 2,3-chloro-methyl-anthraquinone is further washed with dilute sulfuric acid, hot water, and with dilute caustic to remove any un-ring-closed starting material. Thus 210 g. of crystalline, white 2,3-chloro-methyl-anthraquinone of a melting point of 212–216° C. is obtained, equal to 82.0% of theory.

The strong acid mother liquor from the filtration of the 2,3-chloro-methyl-anthraquinone is further diluted with water to an acidity of about 20%. Thus all of the 2,1-chloro-methyl-anthraquinone is precipitated in crystalline form. It is filtered, washed with hot water and with dilute caustic to remove un-ring-closed starting material. Thus 27 g. of crystalline, white 2,1-chloro-methyl-anthraquinone of a melting point of 170–173° C. is obtained, equal to 10.5% of theory.

The particular procedure above outlined for ring-closing the phthalic anhydride-ortho chloro toluene condensation product is not to be construed as part of this invention, it being understood that the amount of sulfuric acid, time and temperature used in carrying out that step of the reaction may be varied within wide limits according to the prior art. Separation of the two isomeric chloro-methyl-anthraquinones from the sulfuric acid ring-closure mass is not dependent upon the amount of sulfuric acid or the temperature at which the separation is effected. A dilution of from about 87% to 75% sulfuric acid gives a good separation of the 2,3-isomer from the ring-closure mass. Instead of 20% sulfuric acid, used in the example, any other strength of dilute sulfuric acid or water may be used to bring the concentration of the acid within the limits necessary for precipitating out the 2,3-isomer. The temperature of the dilution may be varied from room temperature to at least 120° C.

In the separation of the 2,1-chloro-methylanthraquinone from the partially diluted sulfuric acid mass, the dilution may vary within wide limits, it being only necessary to reduce the acidity to a point where all of the 2,1-chloro-methyl-anthraquinone will separate out. The temperature of this dilution may also be varied within wide limits, although it is usually desirable to effect the separation at the temperature which results from the dilution of the sulfuric acid, thereby obviating the necessity of cooling the mass, which necessarily entails added expense.

It is of course obvious that a mixture of these chloro-methyl-anthraquinones, obtained in any manner, may be dissolved in sulfuric acid and separated in the manner above described.

We claim:

1. In the separation of 2,3-chloro-methyl-anthraquinone from 2,1-chloro-methyl-anthraquinone, the step which comprises bringing the dilution of a concentrated sulfuric acid solution of these two isomers to between 87% and 75% sulfuric acid.

2. In the separation of 2,3-chloro-methyl-anthraquinone from 2,1-chloro-methyl-anthraquinone, the steps which comprise bringing the dilution of a concentrated sulfuric acid solution of these two isomers to between 87% and 75% sulfuric acid, separating from the acid solution the 2,3-chloro-methyl-anthraquinone which precipitates out, reducing the concentration of the sulfuric acid solution to a point where substantially all of the 2,1-chloro-methyl-anthraquinone is precipitated, and separating the 2,1-chloro-methyl-anthraquinone therefrom.

3. In the preparation of 2,3-chloro-methyl-anthraquinone by ring-closing in concentrated sulfuric acid the condensation product of ortho-chloro-toluene and phthalic anhydride, the step which comprises bringing the dilution of the concentrated sulfuric acid ring-closure mass to between 87% and 75% sulfuric acid.

4. In the separation of 2,3-chloro-methyl-anthraquinone and 2,1-chloro-methyl-anthraquinone from a concentrated sulfuric acid solution of a mixture of the two isomers, the steps which comprise bringing the dilution of the acid solution to about 83% sulfuric acid, separating out the 2,3-chloro-methyl-anthraquinone which precipitates out and thereafter reducing the concentration of the acid solution to about 20% sulfuric acid and separating out the 2,1-chloro-methyl-anthraquinone which precipitates out.

JOHN M. TINKER.
VIKTOR M. WEINMAYR.